March 31, 1959 R. C. BALLARD 2,880,268
LIGHT FILTER
Filed Nov. 10, 1954 4 Sheets-Sheet 2

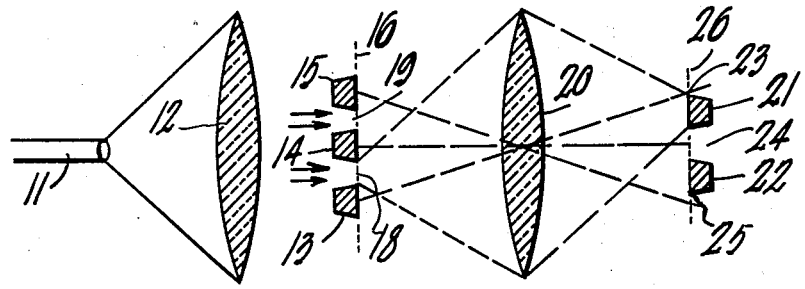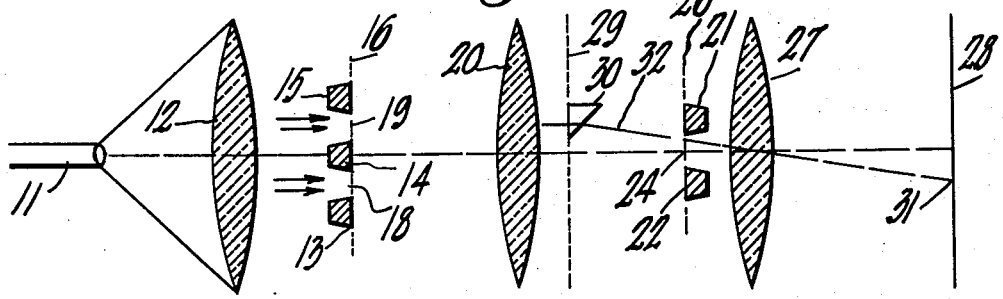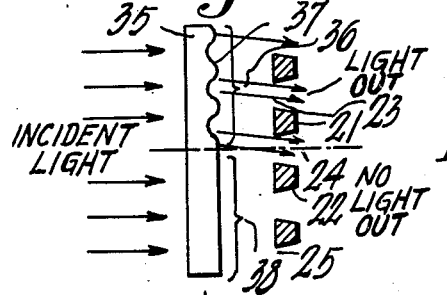

INVENTOR.
Randall C. Ballard
BY
ATTORNEY

INVENTOR.
Randall C. Ballard
BY
ATTORNEY

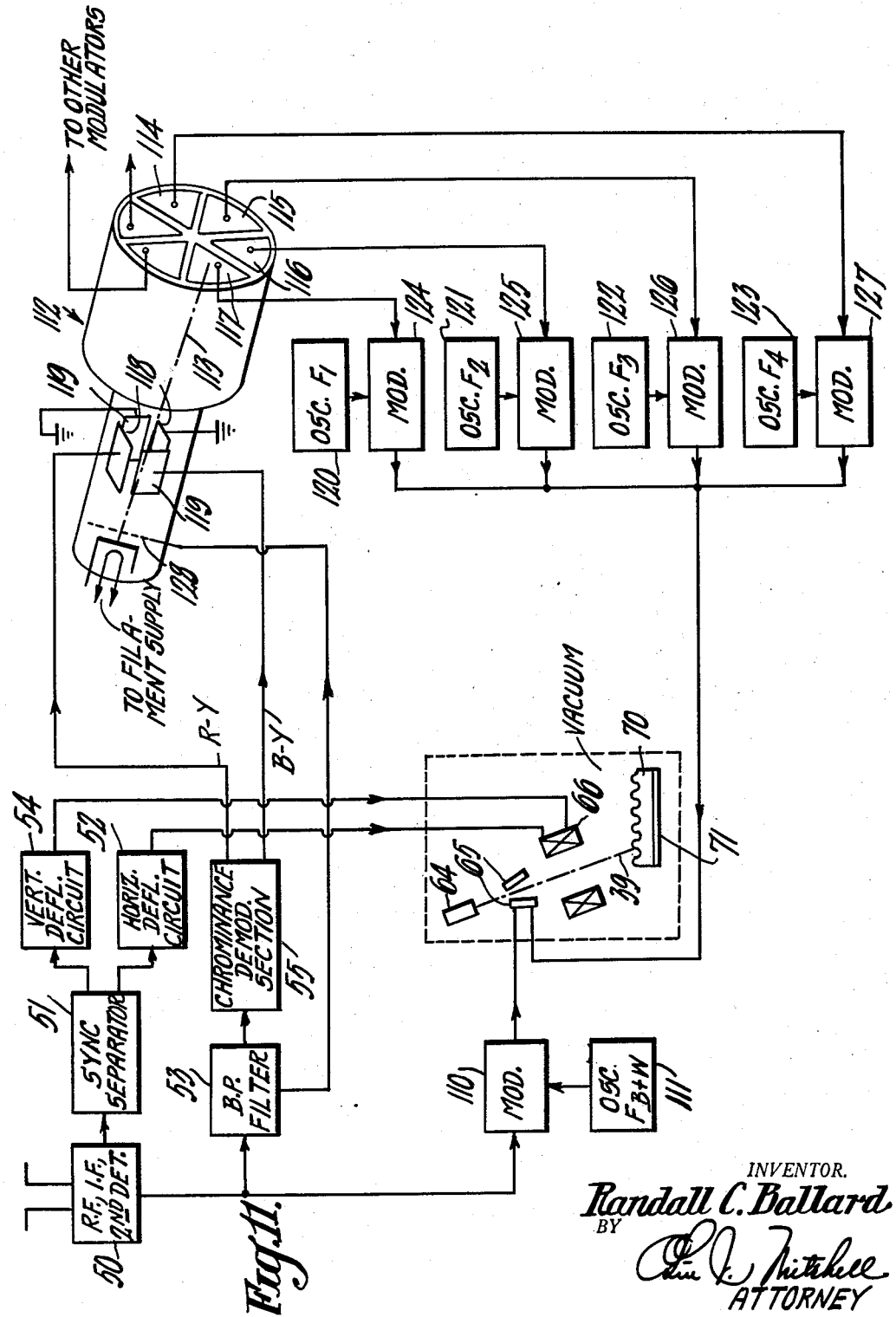

United States Patent Office 2,880,268
Patented Mar. 31, 1959

2,880,268

LIGHT FILTER

Randall Clarence Ballard, Trenton, N.J., assignor to Radio Corporation of America, a corporation of Delaware Application November 10, 1954, Serial No. 468,037

7 Claims. (Cl. 178—5.4)

This invention relates to light filters and especially to light filters for use in color television projection systems.

A light valve action may be obtained by employing an arc light together with an image-bearing surface which is modulated in accordance with the intensity of a scanning electron beam. The scansion of this image-bearing surface causes a deformation which, together with a double slit Schlieren optical system or its equivalent allows light from the arc to fall on a projection screen as a function of the modulation of the surface. Such a light valve can be used for projecting monochrome television images.

The present invention employs a light filter which can be made to produce light of a desired color and simultaneously therewith permits the brightness variations of a televised object to be reproduced with the intense illumination characteristic of an arc or similar type light.

According to this invention in one of its forms, an image-bearing medium such as a transparent and conductive oil film has its surface modulated to cause deformations in its surface. The deformations in the surface form a grill whose spacing is such that, when light of a plurality of wave lengths is passed through the surface of the medium, interference spectra are formed which fall on a slit system. The spacing of the deformations and the slit system are so chosen that substantially only light of predetermined dominant wavelengths corresponding to predetermined colors passes through the slit system. In other forms of the invention, the surface of the image-bearing medium is modulated both in frequency and in amplitude to produce colored television images.

It is an object of the present invention to provide an improved light filter which can selectively filter out desired wave lengths of light.

It is a further object of this invention to provide an improved combined light filter and light valve system which controls the intensity of external light transmitted therethrough and selectively permits only certain wavelengths of the external light to pass.

Other incidental objects and advantages of the present invention will become apparent upon a reading of the following specification and an inspection of the accompanying drawings in which:

Figure 1 is a schematic diagram of a Schlieren optical system;

Figure 2 is a modification of a Schlieren optical system;

Figure 3 is a schematic view of one element of the system shown in Figure 2;

Figure 4 is a graph showing the characteristics of a section shown in Figure 3;

Figure 5 is a graph showing how the modulation of the apparatus shown in Figure 3 is accomplished;

Figure 8 is an enlarged representation of one part of the apparatus shown in Figure 6;

Figure 11 is a block diagram of still another form of this invention.

Figure 6:
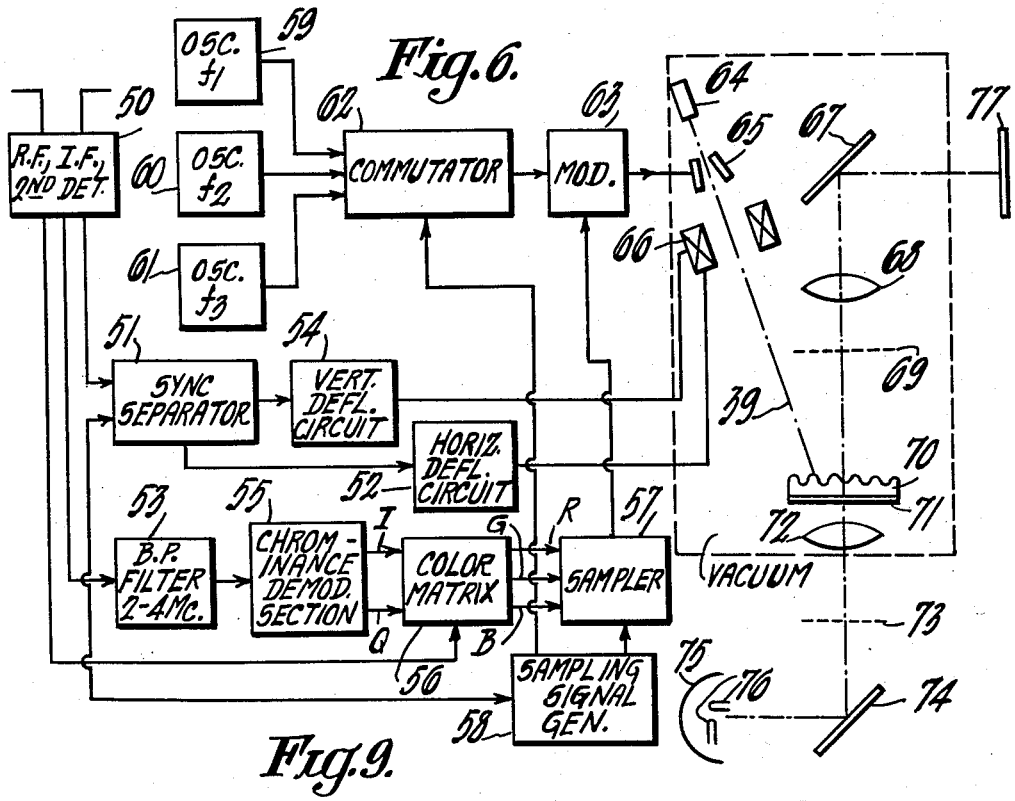
Figure 6 is a schematic representation of an entire color television projection system.

The scientists Foucault and Toepler enunciated and developed optical principles which have since become known as a "Schlieren" system. Figure 1 is a diagram to explain the fundamentals of such a system. An arc lamp 11 produces light which is focused by lens 12 to pass through a slit system comprised of bars 13, 14, and 15 and slits 18 and 19. A ray of light 17 will pass through slit 18 and fall upon a lens 20 which causes it to fall upon a bar 21 thereby preventing it from proceeding further. Bar 22, together with bar 21 form a slit 24. It may be seen that the bar 14 has a common axis with the slit 24, whereas bars 15 and 13 respectively have axes common with those of slits 23 and 25. As a result, the images of the slits 18 and 19 are made to fall on the bars 21 and 22 preventing light from passing into the space to the right of the bars 21 and 22. The bars 21 and 22 lie in a plane 26 whereas the bars 13, 14, and 15 lie in the plane 16.

Figure 2 is essentially the same as Figure 1 with the addition of several features. Similar parts in Figures 1 and 2 bear like numbers. Plane 29 located a short distance behind lens 20 contains a number of small prisms such as prism 30. A ray of light 32, passing through prism 30 is deflected from its original course and passes through slit 24 and an additional lens 27 to fall upon a point 31 in a plane 28. Rays of light parallel and in proximity to ray 32 can therefore partially pass the bars 21 and 22 and be focused by the lens 27 on a viewing surface in plane 28. The brightness of the point 31 depends on how much light is allowed to pass the bars 21 and 22 which in turn depends on the deflection angle of the prism 30.

It has been suggested that the entire plane 29 be composed of many adjustable prisms corresponding to the number of picture element in a television image which is to be projected. The brightness of an image point such as point 31 in the plane 28 could then be controlled by suitably adjusting the deflection angles of the prisms. Rather than actually using prisms it was suggested that an electric charge be deposited by an electron beam upon an image-bearing body such as a thin film of conductive mineral oil shown in the plane 29. The electrostatic forces cause the surface of the oil film to be deformed. By modulating the surface of the oil film with a constant frequency ripple, the effect of numerous individual small prisms is produced. The amplitude of the ripple will then cause the deflection of the light to be varied causing more light to pass through bars 21 and 22 when the amplitude of the ripple is greater, and less light to pass when the amplitude of the ripple is smaller.

In Figure 3 an enlarged sectional view of the film is shown. The film 35 should be as transparent as possible and should be as homogeneous as possible to prevent optical distortion. United States Patent 2,605,352 to E. F. Fischer, issued July 29, 1952 describes the characteristics and desirable properties of one such image-bearing medium.

It may be seen that in section 36 of the oil film 35 a ripple 37 appears on its surface. Section 38 of the oil film 35 has no ripple. The ripple itself may be produced by directing an electron beam upon the surface of the film 35. The beam (not shown) for monochrome picture projection is modulated with a high frequency so that it produces ripples at a given frequency. Light passing through section 38 will fall upon the blocking bars 21 and 22. Light passing through the ripple section 36 will be deflected to some extent and passed through the slits 23 and 24, for example, which are adjacent bars 21 and 22 respectively. The electron beam may also be modulated so that the constant frequency ripples 36 produced have varying amplitudes thus determining what amount of deflected light will pass through the slits 23 and 24.

Figure 3 shows only two conditions, i.e., no light produced as a result of light passing through section 38, and a fixed intensity of light as a result of light passing through the constant amplitude, fixed frequency ripple portion 36.

In Figure 4 is shown the relation of the distribution of image brightness along one line of a raster to the deformation of the oil film 35 along a corresponding strip of the oil. Within the area 40 of a line of the film 35 it is desired to pass a great amount of light corresponding to a high brightness level 41. In such case the ripples 42 are modulated considerably in amplitude. For a less bright image intensity level 44, the area 43 along one line of film 35 has a surface modulation comprised of a number of ripples 45 having a smaller amplitude than ripples 42. Brightness level 46 produces ripples 49 along section 10 having correspondingly smaller amplitude modulation, whereas zero brightness shown by level 47 produces no ripples in the area 48.

In practice, the modulation in amplitude of the ripples is not caused by modulating the intensity of the beam itself. Because such modulation would inevitably produce some rectification, intensity modulation has been found to be impractical. Rectification gives rise to charges on the surface of the oil film which in turn tend to generate a constant deformation of its surface. Therefore, an image once produced on the surface would remain in more or less rudimentary form for a considerable time. In order to prevent this type of disturbance the intensity of the scanning electron beam is maintained constant, but the scanning speed in the direction of the line being scanned is varied to conform to the modulating information signals. As long as the cathode-ray travels along the line with constant velocity, it will deposit a constant charge per unit of length of the surface, the density of this charge being proportional to the writing speed for a constant intensity of the beam. The density of the charge laid down can be varied by varying the writing speed so that if the speed is great only a small charge is deposited; if it is small, a large charge is deposited. In order to produce this modulation the information signals are supplied to the deflection system for the electron beam.

Figure 5 contains a group of curves showing how the velocity modulation of the cathode-ray is accomplished. Curve A plots the charge density along any line being scanned. Curve B plots the velocity of the scanning cathode-ray as it varies along any one line. It is seen that when curve B is at a maximum or at a minimum the charge density is at a corresponding minimum or maximum since the slope is smallest at the maxima or minima of curve B. The frequency of the added modulation of the electron beam in one illustrative case may be on the order of 20 mc. It is highly important that the cathode-ray be accurately focused, and that the electron gun have certain features which control the focus at the desired area.

Figure 6 shows how the present invention can be incorporated in one type of projection system which employs the image-bearing liquid. For illustration purposes it is assumed that conventional, FCC-approved U.S. broadcast color television signals have been transmitted. A receiver 50 containing appropriate RF, IF and second detector stages similar to those found in conventional color television receivers such as the RCA Model CT–100 is used to transform the transmitted electromagnetic waves into useable amplitude variations. Coupled to the receiver 50 is a sync separator 51 which has a triple output. The sync separator 51 may be of any conventional type such as the one shown schematically at page 286 of "Basic Television Principles and Servicing" by B. Grob (first edition, McGraw-Hill, 1949). Separated vertical sync signals are applied to a vertical deflection circuit 54 which also may be of conventional design. It is assumed that the circuit 54 includes an output driver stage which is coupled to deflection yoke 66 containing both horizontal and vertical deflection coils.

Separated horizontal sync signals from sync separator 51 are applied to a horizontal deflection circuit 52 which contains an output driver stage capable of driving the horizontal winding in the deflection yoke 66. The deflection yoke 66 controls the line and field scanning of cathode-ray 78 which is produced by an electron gun 64. The cathode-ray 78 is swept in accordance with the deflection frequencies established by the FCC for U.S. television broadcast.

A band-pass filter 53 having a pass band of 2–4 mc. is coupled to receiver 50. It is the function of the band-pass filter 53 to remove mainly the chrominance components of the transmitted composite color television signal. The output circuit of band-pass filter 53 is coupled to a chrominance demodulation section 55 in which the chrominance components are further broken down into "I" and "Q" signals. The chrominance demodulation section 55 can be of any suitable type such as the one shown on page 26 of Practical Color Television for the Service Industry (first edition) published by the RCA Service Company. It may contain two synchronous detectors which detect information appearing as sidebands of the color subcarrier of 3.579545 mcs., two quadrature phases of which have been modulated by the I and Q signals respectively. The demodulation section 55 may also contain filters for passing the low frequency elements of the demodulated signals. Phase splitters and polarity inverters may also be found in the demodulation section to provide the proper inputs to the color matrix which follows.

To the color matrix 56 the output of the second detector is also coupled. In the color matrix 56, the I signal and the Q signal from the demodulation section 55 are added in certain proportions by a resistance circuit or its equivalent so that signals generally corresponding to the outputs of the studio television camera are obtained. Thus, in the output of the color matrix 56 three signals for the red, green, and blue components respectively of the televised object appear. The matrix 56 may also include D.-C. restorers if the circuitry preceding has resulted in the loss of the low frequency or D.-C. components. A representative color matrix may be found on page 26 of Practical Color Television for the Service Industry cited above.

A sampler 57 is coupled to the output circuits of the color matrix 56 and to a sampling signal generator 58. The latter generator itself may be coupled to sync separator 51 so that it is locked-in with the deflection system. It is not essential that this lock-in feature exist, however. Sampler 57 is adapted to sample the red, green, and blue voltage waves applied to it in sequence and at a rate depending upon the frequency of the signals provided by sampling signal generator 58. It should be noted that the sampler 57 performs both amplitude selection and time selection. It is, for all practical purposes, a time multiplexer. The sampler 57 may be of a type described and illustrated in U.S. Patent No. 2,632,046, entitled "Electronic Switch" issued to E. A. Goldberg on March 17, 1953. The sampling signal generator 58 may be any conventional pulse generator such as a multivibrator or may be a sine wave oscillator depending upon the type of sampling desired and the characteristics of the sampler 57.

The pulse generator 58 is also coupled to a commutator 62 to which are fed continuously three frequencies $f_1$, $f_2$, and $f_3$ from oscillators 59, 60, and 61 respectively. Each time that the sampler 57 produces an output pulse in response to the sampling signals from the generator 58, a similar sampling signal actuates commutator 62 so that short bursts of oscillations having respective frequencies $f_1$, $f_2$, and $f_3$ from a corresponding one of the oscillators 59, 60, or 61 are applied in sequence to a modulator 63. Since the sampler 57 output circuit is also coupled to the modulator 63 each color sample will modulate in amplitude a corresponding short burst of a particular frequency $f_1$, $f_2$, or $f_3$, as the case may be. The modulated burst from modulator 63 is applied to an auxiliary set of deflection plates 65. Plates 65 are responsible in the monochrome television projection system for introducing the velocity modulation of the cathode ray 39 which produces characteristic ripples in the surface of the image-bearing liquid 70.

A concave mirror 75 focuses the light produced by the arc electrodes 76 upon an inclined mirror 74 The mirror 74 reflects the light successively through the first slit system 73, the optical system 72, and the image-bearing liquid 70 which is supported by an essentially transparent base 71 The cathode ray 39 produces ripples on the surface of the liquid 70 as shown which cause the light passing through liquid 70 to be somewhat deflected either to the left or to the right so that it falls in the slits between the blocking bars of the second slit system 69. It should be noticed that the first slit system 73 is so positioned with respect to the second slit system 69 that each bar of the system 73 is optically coaxial with each slit of the slit system 69, and vice versa. Therefore, if the surface of the liquid 70 is not modulated at all, light from mirror 74 will pass through slit system 73 and the image-bearing liquid 70, but will be blocked by the bars of the second slit system 69. Behind the slit system 69 an optical system 68 focuses the light on an inclined mirror 67 which reflects it onto a viewing surface 77. An indicated by the dashed line box, the liquid and the electron gun structure are located in a vacuum.

To produce color in accordance with the present invention not only is the intensity of the electrostatic charge deposited upon the surface of the liquid 70 varied, but also the frequency at which the charge pattern is laid down which causes ripples having corresponding frequencies. Therefore, the surface of the image-bearing liquid 70 is effectively a diffraction grating which, cooperating with slit system 69, operates such that primarily only selected wavelengths of white light transmitted by the first slit system 73 pass through the slits of the second slit system 69. The intensity of the charge pattern or the amplitude of the ripple on the liquid 70 at any point corresponds to the brightness of a corresponding scanning point of the televised object. The frequency of the ripples produced by the frequency modulation impressed upon auxiliary deflection plates 65 produces a colored area in the image on viewing surface 77 corresponding to a scanned element of a televised object. The intensity of the charge pattern of the liquid 70 or, stated in another way, the amplitude of the deformations produced, determines the intensity of each colored area on the viewing surface 77.

A step by step explanation of the effect may now be in order:

Suppose as in Figure 2, a small concentrated light source such as a crater arc 11 is caused to produce a beam of parallel light by employing a collimating lens 12. For the moment, let us assume that a single slit or narrow light opening is used as at slit 19. Now a lens 20 is positioned to focus the rays which pass through the slit 19 to form an image in the plane 26. If a screen were placed in plane 26, a single bright image of the slit 19 would be seen thereupon. Now assume that, instead of prism 30, a pair of narrow parallel slits (not shown) is placed in the plane 29 behind the lens 20. The effect is that of having two new light sources having identical phase relations. This means that at a point directly opposite the pair of narrow slits in plane 26 a central band of white light appears. On each side of this a dark band appears caused by the mutual cancellation of light waves arriving exactly out of phase from the two slits if the path lengths from the two slits differ by one-half wavelength. Further to each side of the central band other light appears which is spread into a spectrum of colors. Blue-violet appears nearest the center and red toward the end of this spectrum. Other spectra are repeated on each side, but are overlapping so that the colors produced are not pure. It is the first order spectrum of light that is employed in this invention.

Simple modifications of the apparatus may be made which intensify the desired first order spectra. One is the use of many relatively narrow slits. These numerous narrow slits are then called a diffraction grating. Diffraction gratings are usually made by ruling parallel lines with a diamond point on a glass or other flat surface. The grooves made by the diamond correspond to the apaque sections between slits. Commonly used gratings are usually replicas of master gratings. These replicas are films made by pouring collodion on the master grating, removing the film and mounting it on a polished surface.

Figure 7:
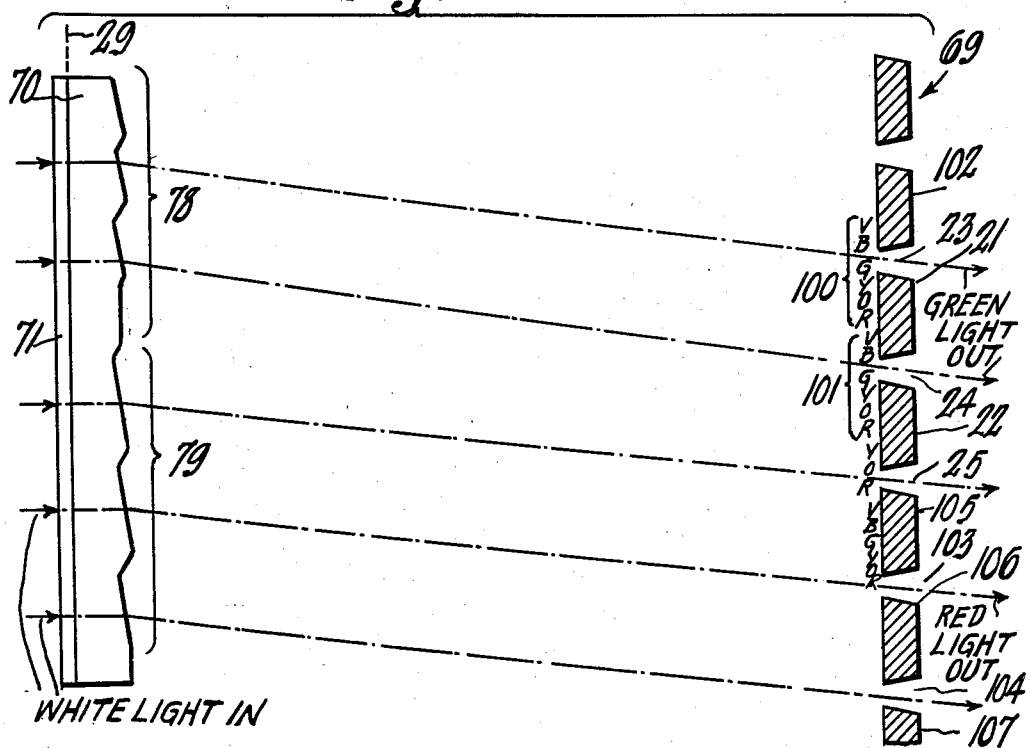
Figure 7 is an enlarged schematic view of a portion of Figure 6.

In Figure 7 an enlarged view of some of the components of Figure 6 is shown. Parts similar to those in Figure 6 are similarly numbered. The collimated white light from the arc light 76 is passed through the supporting member 71 and through the image-bearing liquid 70. The ripples in the surface of the liquid 70 within the section 78 have a frequency which is higher than the ripples indicated by numeral 79. Both sets of ripples effectively form diffraction gratings, the troughs of the ripples corresponding to the etched portions of conventional diffraction gratings. As a result, the white light passing through the ripples 78 is separated into a plurality of spectra one of which is indicated generally by the numeral 100. Another group of ripples 78 forms a similar spectrum 101. In both spectra 100 and 101 practically all of the wavelengths of white light except the wavelengths producing green are blocked by the bars 102 and 21 respectively while the green light passes through the slits 23 and 24 respectively onto the viewing surface 77 (shown in Fig. 6). It is the frequency of the ripples 78 which determines that the green passes through the slits 23 and 24 assuming given dimensions for these slits. It is the amplitude, however, of the ripples 78 which determines how much of the green passes through those slits.

In the case of the ripples 79, a different condition prevails because they have a lower frequency. As a result, the portions of the white light input which appear in the slits 25, 103, and 104 are those corresponding to the red wavelengths, while the other colors are blocked out by bars 22, 105, 106 and 107. While there may be second order spectra produced by each of the ripples in the groups 78 and 79, the explanation has been simplified by omitting them. Actually, these second order spectra will somewhat degrade the quality of the output colors, but then amplitude is so attenuated as not to impair seriously the quality of the image produced on the viewing surface 77.

Another way of showing this effect is indicated in Figure 8. In response to excitation by the cathode-ray 78 which is modulated both in amplitude and in frequency as stated above, the surface of the liquid 70 is deformed as shown. Ripple patterns 86, 87, 88, and 90 correspond to brightness amplitudes 83, 84, 85, and 89. The latter amplitudes represent adjacent image elements along any single scanned line of the fluid 70. For a bright red picture element 82 the ripple pattern 86 shows ripples of large amplitude and relatively low frequency. For a low brightness blue element 85, the ripple pattern 88 shows small amplitude, and high frequency variations. For an intermediate brightness green area 84 the ripple pattern 87 shows an intermediate amplitude and intermediate frequency modulation of the surface of liquid 70. For a black area 89 having no brightness and no hue, the surface portion 90 of the image-bearing liquid 70 is completely unmodulated.

Figure 9:
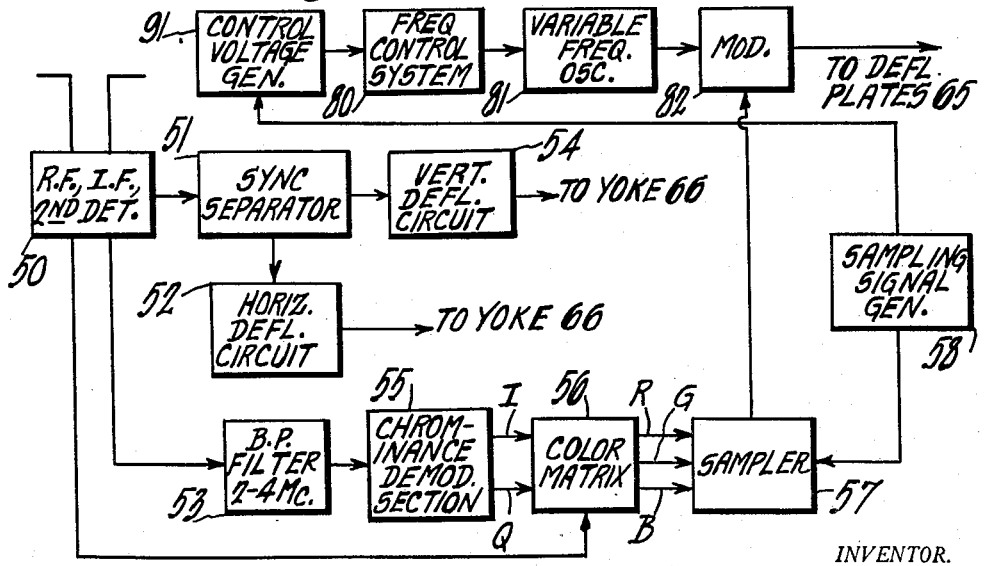
Figure 9 is a block diagram of another form of this invention.

Figure 9 shows another alternative method of producing essentially the same result as that obtained by the apparatus of Figure 6, and similar parts are similarly numbered. Instead of having three separate oscillators such as shown in Figure 6, only one variable frequency oscillator 81 is used. Its frequency is controlled by a frequency control system 80 which in turn responds to three sequentially applied voltage waves furnished by control voltage generator 91. These three voltage waves may be produced by any step-wave generator or its equivalent. The frequency control system 80 may be a reactance tube device such as is common in automatic phase or frequency control circuits. The control system 80 produces respectively different reactances across the variable oscillator 81 in response to the voltage waves from generator 91. As a result, the variable frequency oscillator 81 will successively produce three different oscillatory waves having corresponding frequencies which are successively applied to modulator 82.

The sampler 57 provides successive amplitude samples of the red, green, and blue representative voltage waves to the modulator 82 which modulates the oscillatory waves therewith. Each of these frequencies produced by variable oscillator 81 is such as to produce a surface modulation of liquid 70 which causes the latter to act as an effective diffraction grating so that light of a particular color passes through the slit system 69. The intensity of a particular color component of a scanned picture element of a televised object will determine the amplitude of a corresponding sample of one of the color representative waves applied to sampler 57. This sample will modulate one of the corresponding oscillatory waves in amplitude, the amplitude modulation determining, in turn, how much light of that color will pass slit system 69.

Figure 10:
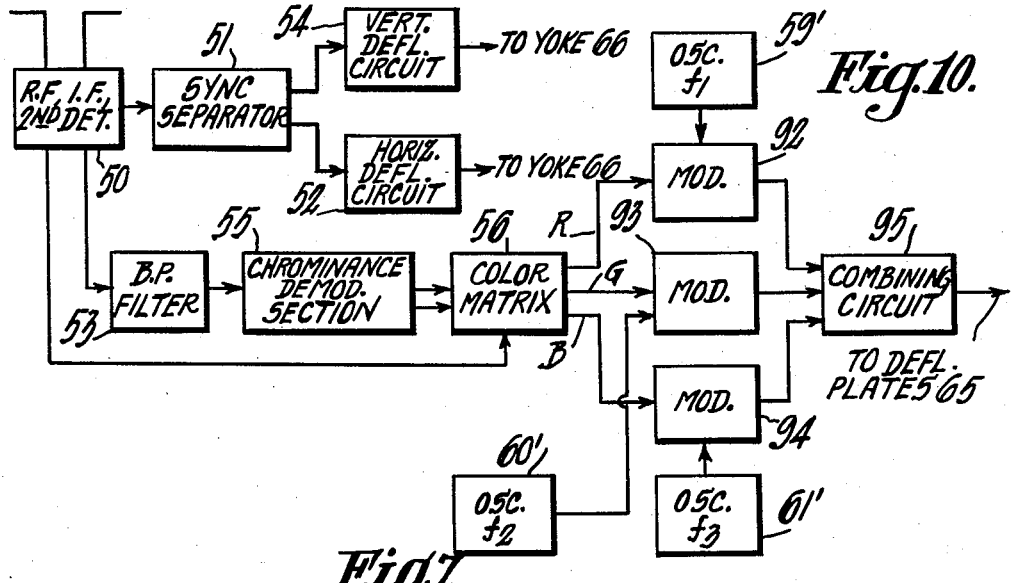
Figure 10 is a block diagram of another form of this invention.

Figure 10 shows another form of the invention in which a number of the elements of the system are identical to their counterparts in Figure 8 and are similarly numbered. The chief difference between this form of the invention and those preceding is that the modulation of the surface of the image bearing liquid 70 is the result of simultaneous modulation of the cathode ray by color representative voltage waves having three different frequencies which have been combined into a single, complex modulated wave. Thus the output voltage waves of the color matrix which are representative of the red, green and blue components of a televised object are applied to modulators 92, 93 and 94 respectively. To each of these modulators, oscillators 59', 60', and 61' are respectively coupled. The frequencies $f_1$, $f_2$, $f_3$, may be such as to cause the image bearing surface of liquid 70 in combination with the slit system 69 to produce corresponding rays of colors on the viewing surface 77. The relative proportions of the red, green and blue representative voltage waves respectively determine the amplitude of the modulation of each of the waves having frequencies $f_1$, $f_2$, and $f_3$ respectively, and thereby how much red, green, and blue light passes slit system 69. The output modulation products of each of the modulators 92, 93 and 94 is applied to a combining circuit 95 where they are formed into a single, complex wave which is the resultant of the superimposition of the three individual modulation product waves. Thus a complex wave will be fed to the deflection plates 65 so that each element of the surface 70 may now have, for a corresponding element of the raster scanned, a complex ripple pattern. There may be some scattering of selected portions of the light spectrum through the wrong interstices of the slit system 69 with some resultant dilution or contamination of the image. These effects are second or higher order effects, and therefore will not impair the quality of the reproduced picture to any great extent.

Figure 11 shows another form which the invention may take. Some of the components shown may be identical to those shown in Figure 10, and they are therefore numbered the same. The RF, IF and 2nd detector stages of a color television receiver are shown in block 50. A sync separator 51 feeds the vertical oscillator 54 and the horizontal oscillator 52 with sync signals which respectively cause the oscillators 54 and 52 to energize yoke 66 with the proper deflection signals.

The band pass filter 53 has two outputs. One of them feeds the chrominance demodulation section 55 with signals in the frequency region ranging approximately from 2–4 mc. This region is composed principally of the chrominance components. If the subcarrier is applied in quadrature phases to demodulate synchronously the frequencies passed by filter 53, R—Y and B—Y voltage representative waves may be secured. These two waves are applied to vertical deflection plates 118 and horizontal deflection plates 119, respectively, of a special—purpose tube indicated generally by the numeral 112. The general construction of such a tube may be suggested by U.S. Patent Serial No. 2,534,372, issued to D. H. Ring. As a result, the beam 113 will be deflected so that it lands on one of the conductive target segments 114, 115, 116, and 117. These segments are located inside the tube 112 on the inner surface of the faceplate. Depending on the relative amplitude of the R—Y and B—Y voltage waves, the beam 113 will land on the conductive target segment of the tube 112 which corresponds to the phase of the resultant vector representative of the modulation of the subcarrier by the R—Y and B—Y signals before demodulation. Since the phase of this resultant corresponds to a particular hue, each of the conductive target segments may be connected to a different oscillator which will have a frequency such that, when it is used to modulate the cathode-ray beam which impinges on the image-bearing liquid 70, light of a particular narrow band of wavelengths is caused to appear on the viewing surface 77 as explained in connection with Figure 6.

To accomplish this, modulators 124, 125, 126 and 127 (and as many more as are desired) are coupled to conductive segments 117, 116, 115 and 114 respectively. Each of these modulators is also adapted to receive frequencies $F_1$, $F_2$, $F_3$, and $F_4$ respectively from oscillators 120, 121, 122 and 123. These frequencies $F_1$, $F_2$, $F_3$ and $F_4$ (and whatever others are desired) may produce such colors as blue, green, yellow, and red (or other additional hues depending on the number of conductive segments and the number of oscillator-modulator pairs employed). However, colors which are produced by combining blue and red, for example, cannot be produced. With a sufficient number of colors selected which lie along the B—G and G—R sides of the CIE chromaticity triangle almost any color of the spectrum may be produced on the viewing surface 77.

The particular hue produced on a given portion of the viewing surface 77 is due to the activation of a particular one of the oscillators 120, 121, etc. The modulators 124, 125, etc., are of the type which have zero output in the absence of any modulating signal applied to its input. The intensity of a particular hue is obtained by modulating the electron beam 113 with the resultant of the two vectorial components $E_R-$, $E_Y$, $E_B-$, $E_Y$ which laregly comprise the output of the bandpass filter 53. This resultant voltage wave is applied to a control electrode 128 which modulates the intensity of the beam 113.

In order to reproduce the brightness of a particular scan element of a televised object the following is done. The output wave of the second detector portion of block 50 is an amplitude modulated signal having a bandwidth of approximately 0–4 mc. and contains the luminance or brightness information. It is applied to modulator 110 to which a voltage wave having a frequency $F_{B+W}$ is applied from oscillator 111. Ordinarily this frequency will be considerably higher than that of any one of the oscillators 120, 121, 122, or 123, for example, because when it is used to modulate the beam which scans the image-bearing surface 70, ripples must be formed which have a frequency such as to scatter most of the wavelengths of light indiscriminately instead of providing selective interference patterns. The output wave of modulator 110 is applied to the auxiliary deflection plates 65.

Thus the deflection plates 65 receive two types of signals. The first is a relatively high frequency $F_{B+W}$ from oscillator 111 via modulator 110 which contains the brightness components. The second signals consist of the particular modulated oscillatory waves from modulators 124, 125, etc., which contain the components determinative of the hue of televised objects. As a result, the cathode ray electron beam 78 will cause amplitude modulated high frequency ripples on the surface of the image-bearing liquid 70 corresponding to the brightness information as well as amplitude modulated lower frequency ripples corresponding to the hue of particular scan elements.

Having thus described the invention, what is claimed is:

1. Apparatus for producing color television images by means of a source of a plurality of wavelengths of light, an image-bearing medium, means for deforming the surface of said medium, first and second slit systems, said medium being located between said first and second slit systems, said source being adapted to cause said light of said plurality of wavelengths to pass through said first slit system and through said image-bearing medium, means for applying signals representative of the color components of said televised objects to said means for deforming said medium, said deforming means thereupon being adapted to cause frequency and amplitude modulated deformations in said medium, the frequencies of said modulated deformations being such as to permit only certain of said plurality of wavelengths of light to pass through said second slit system onto said viewing surface, the amplitude of said modulated deformations being such as to control the amounts of said certain wavelengths which pass through said second slit system, said light passing second slit system in response to said amplitude and frequency modulated deformations being adapted to produce color television images on a viewing surface.

2. Apparatus for producing color television images, comprising first and second slit systems, an image-bearing medium located between said slit systems, means for transmitting light of a plurality of wavelengths through said first slit system and through said medium, means for deforming the surface of said medium, means for applying signals representative of selected color components of televised objects to said deforming means, said deforming means thereupon causing deformations in said medium whose frequency is related to the hue of said color components, said deforming means being further adapted to modulate said deformations in amplitude, the amplitude of said modulations being related to the intensity of said color components, said frequency of said deformations causing said medium to form interference spectra on said second slit system so that said second slit system passes substantially only light of predetermined dominant wavelengths, said amplitude modulations causing proportionate amounts of light of said predetermined dominant wavelengths to pass through said second slit system.

3. Color television projection apparatus, comprising first and second slit systems, an image-bearing medium located between said first and second slit systems, means for transmitting light of a plurality of wave lengths through said first slit system and through said medium, means including deflecting means for deforming the surface of said medium, means for producing a plurality of oscillatory waves having respectively different frequencies, modulating means adapted to be coupled to one of said means for producing said oscillatory waves at a time, said modulating means also being coupled to said means for deforming said medium, a source of a plurality of voltage waves representative of selected color components of televised objects, means for applying each of said oscillatory waves in sequence to said modulating means, means for applying each of said color representative voltage waves in sequence to said modulating means, said modulating means thereupon modulating one of said plurality of oscillatory waves in response to a corresponding one of said color representative voltage waves, said deforming means thereby successively causing deformations in said medium whose frequency corresponds to the frequency of each of said oscillatory waves in sequence, the amplitude of said deformations being related to each of said color representative voltage waves in succession, said medium thereupon causing successively different interference spectra to fall upon said second slit system in response to light transmitted by said medium, said spectra falling on said second slit system in such fashion that substantially only light of successively different predetermined dominant wavelengths passes therethrough to form a color image on a viewing surface.

4. Color television projection apparatus, comprising first and second slit systems, an image-bearing medium located between said slit systems, means for transmitting light of a plurality of wavelengths through said first slit system and through said medium, means including deflection means for deforming the surface of said medium, a variable frequency oscillator, modulating means coupled to said variable frequency oscillator and to said deforming means, a source of a plurality of voltage waves representative of selected color components of televised objects, means for applying each of said color representative voltage waves to said modulator in sequence, means for changing the frequency of said variable frequency oscillator in synchronism with said sequence in which said color representative voltage waves are applied to said modulator, said deforming means thereupon causing deformations in said medium whose frequency is sequentially varied so as to form interference spectra on said second slit in response to light transmitted through said medium, said successive spectra falling on said slit system so that substantially only light of sequentially different predetermined dominant wavelengths passes through said second slit system to form an image on a viewing surface, the amplitude of said successive frequency deformations being related to corresponding ones of said color representative voltage waves and causing proportionate amounts of light of successively different predetermined dominant wavelengths to pass through said second slit system on to said viewing surface.

5. Color television projection apparatus, comprising first and second slit systems, an image-bearing medium located between said slit systems, means for transmitting light of a plurality of wavelengths through said first slit system and through said medium, means including deflecting means for deforming the surface of said medium, a plurality of means for producing oscillatory waves having respectively different freqeuncies, a plurality of modulating means each coupled to a corresponding one of said means for producing said oscillatory waves, means for applying each of a plurality of voltage waves representative of selected color components of televised objects to a corresponding one of said modulating means, said modulating means thereupon being adapted to produce output waves of a given frequency which are modulated in amplitude in response to one of said color representative voltage waves, means for combining said output waves, means for applying said combined output waves to said means for deforming said medium, said medium thereupon producing interference spectra, said interference spectra falling upon said second slit system such that substantially only light of predetermined dominant wavelengths passes through said second slit system, said dominant wavelengths being related to the colors of which said voltage waves are representative, the amount of light of said predetermined dominant wavelengths passing through said second slit system being related to the intensity of said color representative voltage waves.

6. Color television projection apparatus, comprising first and second slit systems, an image-bearing medium located between said first and second slit systems, means for transmitting light of a plurality of wavelengths through said first slit system and through said medium, means including deflecting means for deforming the surface of said medium, a source of composite color television signals which contain luminance and chrominance components, said chrominance components resulting from the modulation of quadrature phases of a color sub-carrier in amplitude by at least two voltage waves representative of selected color components of televised objects, said modulated quadrature phases having been combined with one another and with said luminance components, means for separating said combined modulated quadrature phase components, means coupled to said last-named separating means for extracting said color representative voltage waves from said combined modulated quadrature phase components, a phase-discriminating means having a plurality of output circuits, means for applying said separated combined quadrature phase components to said device, means for applying said extracted color representative voltage waves to said device, a plurality of modulators each of which is coupled to a corresponding one of said output circuits, a plurality of oscillatory wave sources each coupled to a corresponding one of said modulators, each of said oscillatory waves having respectively different frequencies, said phase-discriminating means being adapted to apply said combined quadrature phase components to a particular one of said modulators at a particular instant in response to the resultant phase of said combined modulated quadrature phase components, said modulators having a common output circuit coupled to said means for deforming the surface of said medium, said deforming means thereupon causing deformations in the surface of said medium whose frequency is such that said medium causes respectively different interference spectra to fall upon said second slit system in response to light transmitted by said medium, said spectra falling on said second slit system in such fashion that substantially only light of respectively different predetermined dominant wavelengths related to respectively different colors of said televised objects passes through said second slit system onto a viewing surface, means for separating the luminance components from said composite color television signal, means coupled to said luminance component separating means and to said deforming means for modulating an oscillatory wave in response to said luminance components, said deforming means thereupon causing deformations in the surface of said medium which have a frequency corresponding to that of said last-named oscillatory wave and an amplitude corresponding to that of said luminance components, said last-named deformations thereby determining how much of said light of a plurality of wavelengths which has been transmitted through said first slit system and through said medium passes through said second slit system onto said viewing surface.

7. A system for projecting color television images in response to signals containing a plurality of voltage waves representative of selected color components and representative of the luminance components of a televised object, comprising in combination first and second slit systems, an essentially transparent conductive liquid positioned intermediate said first and second slit systems, means for modulating said liquid in response to said luminance components whereby surface deformations of said liquid having amplitude variations corresponding thereto are produced, means for modulating said liquid whereby surface deformations having frequency and amplitude variations corresponding to said color components are produced, and means for passing light having a plurality of wavelengths through said first slit system and said liquid, said liquid thereupon being adapted to cause varying amounts of said light to pass through said second slit system as a function of the amplitude of the deformations in its surface corresponding to said luminance components, said liquid being further adapted to cause light of a restricted number of said plurality of wavelengths to pass said second slit system as a function of the frequency of the deformations in its surface corresponding to said color components, said light passing said second slit system thereby producing a color television image on a viewing surface.

References Cited in the file of this patent

UNITED STATES PATENTS

| | | |
|---|---|---|
| 2,109,540 | Leishman | Mar. 1, 1938 |
| 2,513,520 | Rosenthal | July 4, 1950 |
| 2,813,146 | Glenn | Nov. 12, 1957 |